(12) United States Patent
Szigeti et al.

(10) Patent No.: US 12,050,584 B2
(45) Date of Patent: Jul. 30, 2024

(54) CONTENT TRACKING AND UPDATING

(71) Applicant: Cisco Technology, Inc., San Jose, CA (US)

(72) Inventors: Thomas Szigeti, Vancouver (CA); Robert E. Barton, Richmond (CA); Jerome Henry, Pittsboro, NC (US); Brian C. Powell, El Segundo, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/695,342

(22) Filed: Mar. 15, 2022

(65) Prior Publication Data

US 2023/0297556 A1 Sep. 21, 2023

(51) Int. Cl.
*G06F 16/23* (2019.01)
*G06F 9/54* (2006.01)
*H04L 12/18* (2006.01)

(52) U.S. Cl.
CPC ............ *G06F 16/2358* (2019.01); *G06F 9/54* (2013.01); *G06F 16/2329* (2019.01); *H04L 12/1813* (2013.01)

(58) Field of Classification Search
CPC .... G06F 16/2358; G06F 16/2329; G06F 9/54; H04L 12/1813
See application file for complete search history.

(56) References Cited

U.S. PATENT DOCUMENTS

| | | | |
|---|---|---|---|
| 5,778,398 A | 7/1998 | Nagashima et al. | |
| 8,544,060 B1 | 9/2013 | Khetawat | |
| 9,237,170 B2 | 1/2016 | Kiang et al. | |
| 9,300,693 B1 | 3/2016 | Manmohan et al. | |
| 9,311,499 B2 | 4/2016 | Redlich et al. | |
| 9,363,293 B2 | 6/2016 | Das et al. | |
| 10,079,835 B1 | 9/2018 | Dodke et al. | |
| 10,348,783 B2 | 7/2019 | Kowal et al. | |
| 10,887,669 B2 | 1/2021 | Deshpande | |
| 10,936,739 B1 | 3/2021 | Lim et al. | |
| 2003/0147549 A1* | 8/2003 | Choi | H04N 1/32203 382/232 |
| 2007/0294173 A1 | 12/2007 | Levy et al. | |
| 2008/0163364 A1 | 7/2008 | Ferlitsch | |
| 2010/0268740 A1 | 10/2010 | Barker et al. | |
| 2014/0117073 A1 | 5/2014 | Bell | |
| 2016/0117517 A1 | 4/2016 | Li et al. | |

(Continued)

OTHER PUBLICATIONS

IMATAG Introduction "IMATAG" Dec. 21, 2021 pp. 1-10 (Year: 2021).*

(Continued)

*Primary Examiner* — Sherrod L Keaton
(74) *Attorney, Agent, or Firm* — Edell, Shapiro & Finnan, LLC

(57) ABSTRACT

A method, computer system, and computer program product are provided for managing content items, including tracking and/or updating content items. A content item is received from an author. A key is associated with the content item. Based on the key, a user is identified who is presenting the content item in a communication session. In response to determining that the author has updated the content item, the user is notified that an updated version of the content item is available for presentation in the communication session.

20 Claims, 14 Drawing Sheets

(56) References Cited

U.S. PATENT DOCUMENTS

| | | | |
|---|---|---|---|
| 2016/0140681 | A1 | 5/2016 | Ramos |
| 2017/0118271 | A1 | 4/2017 | Reyes |
| 2017/0200122 | A1* | 7/2017 | Edson ............... H04L 63/104 |
| 2017/0262159 | A1 | 9/2017 | Denoue et al. |
| 2017/0308297 | A1* | 10/2017 | Roberts ............ G06F 12/1045 |
| 2020/0019716 | A1 | 1/2020 | Leonard et al. |
| 2020/0186857 | A1* | 6/2020 | Easley ............ H04N 21/25816 |
| 2020/0342131 | A1 | 10/2020 | Giralt |
| 2021/0058439 | A1 | 2/2021 | Yuan |
| 2021/0226995 | A1 | 7/2021 | Lear et al. |

OTHER PUBLICATIONS

Frédéric Dufaux et al., "Privacy Enabling Technology for Video Surveillance", https:/infoscience.epfl.ch/record/91037/files/Dufaux2006_1542.pdf, downloaded Dec. 21, 2018, 12 pages.

Personify, "FAQs—ChromaCam," Feb. 19, 2019, 13 pages.

Randy Devlin, "Data Loss Prevention," GIAC (GSEC) Gold Certification, Sep. 6, 2015, 30 pages.

Tribhuvanesh Orekondy et al., "Connecting Pixels to Privacy and Utility: Automatic Redaction of Private Information in Images," arXiv:1712.01066v1 [cs.CV], Dec. 4, 2017, 21 pages.

Personify, "ChromaCam," https://personifyinc.com/products/chromacam, downloaded Mar. 1, 2019, 5 pages.

IMATAG, "IMATAG Introduction," retrieved from https://d2i0awu7puyonj.cloudfront.net/3/101789/d8a4d1d2-ec61-41f2-8e6f-21fcd9db3488.pdf, on Dec. 21, 2021, 10 pages.

Nainar, et al., "Policy and Metadata Controlled Meeting Granular Content Visibility and Access for Remote Participants," An IP.com Prior Art Database Technical Disclosure, IP.com No. IPCOM000253181D, Mar. 12, 2018, 5 pages.

Chow, et al., "A QR Code Watermarking Approach based on the DWT-DCT Technique," Conference Paper in Lecture Notes in Computer Science, Australasian Conference on Information Security and Privacy, May 2017, 20 pages.

Vongpradhip, et al., "QR Code Using Invisible Watermarking in Frequency Domain," 2011 Ninth International Conference on ICT and Knowledge Engineering, Jan. 2012, 6 pages.

Harichandra Babu, et al., "Enhancing Web Conferencing Privacy Protection", Technical Disclosure Commons, https://www.tdcommons.org/dpubs_series/4570, Sep. 2, 2021, 13 pages.

Simply Unique, "Invisible Barcode Could Revolutionise Packaging Market," https://www.interpack.com/en/Discover/TIGHTLY_PACKED_Magazine/FOOD_INDUSTRY_PACKAGING/News/Invisible_barcode_could_revolulionise_packaging_market, retrieved Mar. 10, 2022, 5 pages.

Kuan et al., "Visible Graphic QR Code With Embedded Invisible QR Code to Enhance Anti-Counterfeiting Features," Proceedings of 132nd IASTEM International Conference, Aug. 2018, 6 pages.

Nishane, et al., "Digital Image Watermarking based on DWT using QR Code," International Journal of Current Engineering and Technology, vol. 5, No. 3, Jun. 2015, 3 pages.

\* cited by examiner

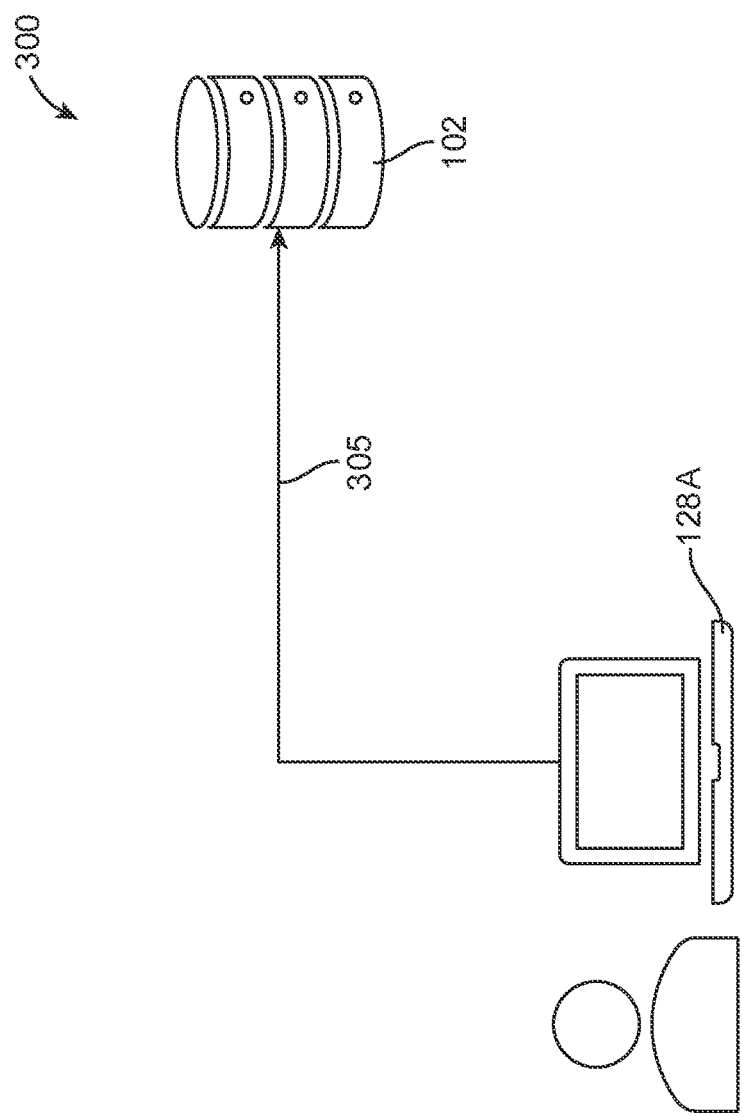

CONTENT TRACKING AND UPDATING

TECHNICAL FIELD

The present disclosure relates to data management and information technology, and more specifically, to content tracking and updating.

BACKGROUND

In the field of data management and information technology, large enterprises can produce an immense quantity of content that can be difficult to control and/or track. Moreover, due to the increase in popularity of collaborative meeting sessions (e.g., video conferencing), content is increasingly shared between remote participants. Conventional approaches to data management struggle to track downstream usage of content, such as particular slides, graphs, or paragraphs that a user copies from one document and subsequently uses in another. Additionally, a subsequent user of copied content may inadvertently share outdated content in the case that the original author has updated the original content. Accordingly, it is desirable to provide a data management platform that enables central tracking of content to observe and manage the consumption of content while also ensuring that copied content can be updated.

BRIEF DESCRIPTION OF THE DRAWINGS

FIGS. 3A and 3B are diagrams depicting a workflow for managing copied content items, in accordance with an example embodiment.

DESCRIPTION OF EXAMPLE EMBODIMENTS

Overview

Figure 1:
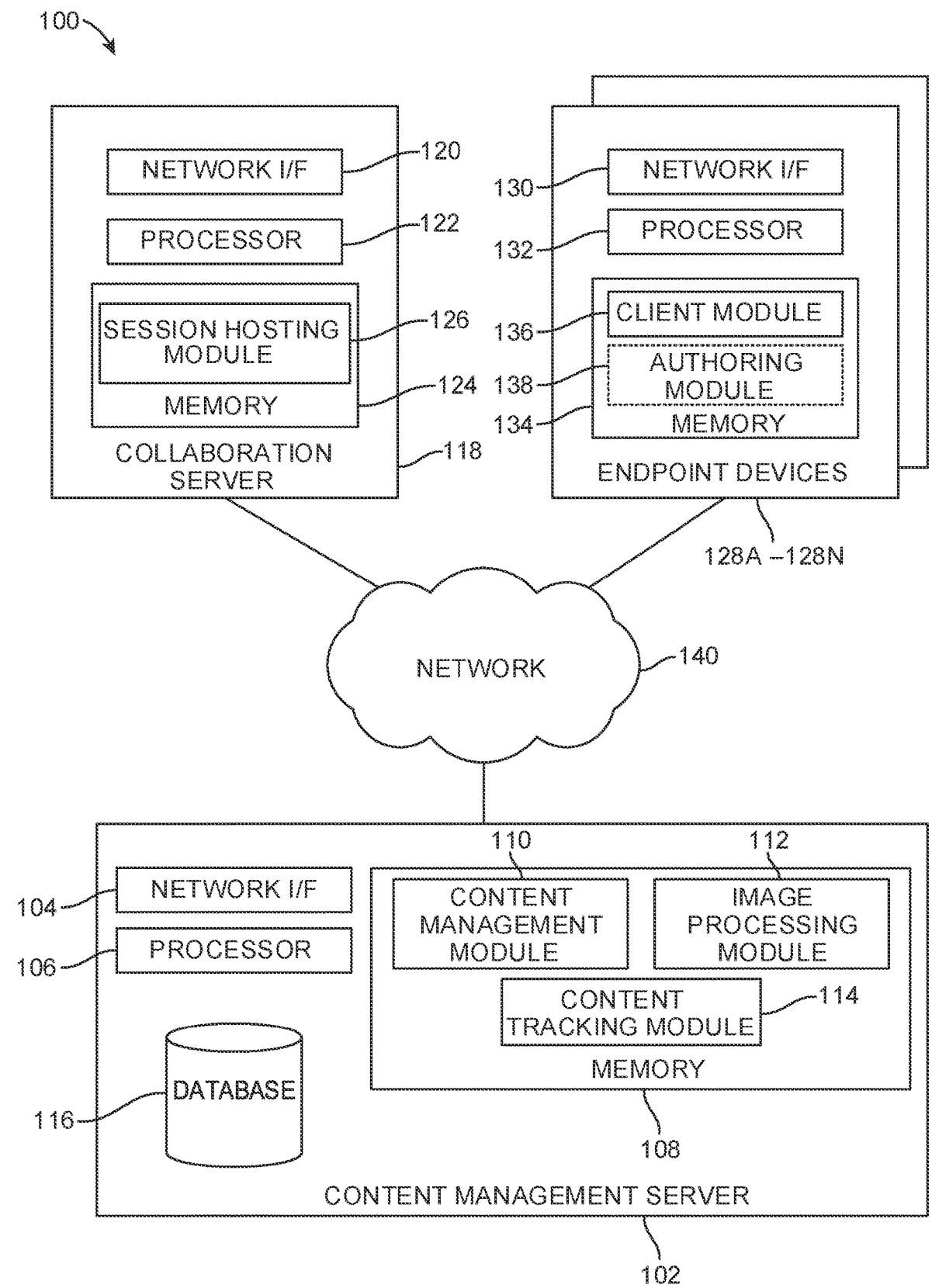
FIG. 1 is a block diagram depicting an environment for managing content items, in accordance with an example embodiment.

According to one embodiment, techniques are provided for managing content items, including tracking and/or updating content items. A content item is received from an author. A key is associated with the content item. Based on the key, a user is identified who is presenting the content item in a communication session. In response to determining that the author has updated the content item, the user is notified that an updated version of the content item is available for presentation in the communication session.

Example Embodiments

Embodiments are provided for data management, and more specifically, to tracking and/or updating content, including content that is shared in collaborative applications.

In the field of data management and information technology, organizations may desire to track data that is shared between users. Typically, data usage is tracked by controlling access to the data, so usage of the data can be inferred whenever access to the data is granted. However, such conventional approaches to tracking data can fail when data is permitted to be copied, as downstream control of the data can no longer be maintained. For example, when content is copied or shared via collaborative applications (e.g., during a video conferencing session), the original author may no longer know where copies of the data are used by others.

Accordingly, present embodiments provide a central content tracking and/or updating solution in which content items within documents can be managed at any level of granularity in order to track usage of those content items, to identify when outdated content items are being used, and/or to provide automated approaches to updating content items that have been copied into other documents and/or are being presented. In particular, a content item can be tagged with a key that enables detection of the content item in a network. The key may remain associated with a content item when the content item is copied, thereby providing downstream control of content. Furthermore, a server that hosts a collaborative application session may detect keys of content items that a user desires to share during the session, and can identify when presented content items are out-of-date and automatically alert the author or presenter, and/or update the content item. The key may be encoded visually in a manner that is not discernable by human vision but is machine-detectable, thereby enabling even screenshotted copies of content items, or copies of content items obtained from video recordings of a previous presentation, to be tracked.

Thus, present embodiments provide the practical application of providing downstream control of content items in a manner that enables usage to be observed and further, prevents outdated content from being presented. By tracking downstream usage of content items, an author can be presented with any desired statistics, including how many copies of the author's content item exist, dwell item of other users on particular content items (e.g., the amount of time a content item is presented on a user interface), and the like. Thus, an author can see which content items his or her colleagues find particularly useful or interesting, thereby providing valuable feedback that can easily increase the productivity of members of an organization. Accordingly, present embodiments provide technical improvements to the fields of data management and information technology by providing a content control service that can maintain downstream control of content items, enabling both tracking and updating of content items, including content items that are shared via collaboration applications (e.g., video presentation applications).

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for managing content items, in accordance with an example embodiment. As depicted, environment 100 includes a content management server 102, a collaboration server 118, endpoint devices 128A-128N, and a (communication) network 140. It is to be understood that the functional division among components of environment 100 have been chosen for purposes of explaining various embodiments and is not to be construed as a limiting example. In general, content management server 102 manages content items, which can be tracked and/or updated even when copied or shared in collaboration sessions.

Content management server 102 includes a network interface (I/F) 104, at least one processor 106, memory 108, and a database 116. Memory 108 stores software instructions for a content management module 110, an image processing module 112, and a content tracking module 114. Network interface 104 may include one or more network interface cards, line cards, etc., and enables components of content management server 102 to send and receive data over a network, such as network 140. In general, content management server 102 enables a content author or other user to register content items with a central database (e.g., database 116) in order to manage content items in accordance with present embodiments. Content management server 102 may include internal and external hardware components, as depicted and described in further detail with respect to FIG. 12.

Content management module 110, image processing module 112, and content tracking module 114 may include one or more modules or units to perform various functions of the embodiments described below. Content management module 110, image processing module 112, and content tracking module 114 may be implemented by any combination of any quantity of software and/or hardware modules or units, and may reside within memory 108 of content management server 102 for execution by a processor, such as processor 106.

Content management module 110 enables content items to be managed, including tracking usage, detecting out-of-date content items, and/or updating content items in accordance with present embodiments. In particular, content management module 110 may receive a content item from the content author, may generate a key for the content item that can be used to track the content items, and may store associations between content authors, keys, and/or content item. In some embodiments, content management module 110 receives and stores data corresponding to a copy of a content item itself.

A user, such as a content author, may provide content management module 110 with a request to associate a key with a content item. The request may include data corresponding to the content item and/or may include the identity of the user (e.g., name, employee identification number, username, email address, etc.) The key that content management module 110 assigns to a content item may include a particular value that is either computed at the time of assignment or predetermined. In some embodiments, content management module 110 may assign keys to content items in a consecutive order; for example, each key may be a numerical value, hexadecimal value, alphanumeric value, etc., that is incremented in some manner at each new assignment of a key. In some embodiments, key values may be based on specific database entries, such as a column and row of a database at which the details of the content item, such as the identity of the content author, are stored. In other embodiments, the values for keys may be randomly or pseudo-randomly assigned, e.g., as a random string of text, selection of random adjective-adjective-noun combination, etc. In some embodiments, content management module 110 may generate a graphical indicator, such as a two-dimensional barcode, that encodes a key value, and may return the graphical indicator to a requesting endpoint device rather than returning the key value itself.

A same key may remain associated with a content item even when the content author updates the content item. Content management module 110 may receive a notification from a computing device of a content author in response to the content author updating the content item, and content management module 110 may indicate in a database that the content item has been updated. In some embodiments, content management module 110 receives a copy of an updated content item, which can be stored in a database (e.g., database 116).

Image processing module 112 employs one or more image processing techniques in order to identify graphical indicators that are associated with keys and that have been inserted into content items. Image processing module 112 may analyze images of content items that a user (e.g., a user other than the content author) has requested to share during a collaborative meeting session. Additionally or alternatively, image processing module 112 may receive images and/or copies of content items when a user inspects the content items at their endpoint device. For example, when a user opens a document that includes one or more content items, the user's endpoint device may transmit copies of the content items or images of the content items (e.g., screenshots) to image processing module 112 for further analysis. By analyzing images of the content items, image processing module 112 may extract key values that can be used to track content items and/or determine whether any content items have been updated.

In some embodiments, one or more graphical indicators are inserted into a content item in a manner that is machine-detectable but not visible to the human eye. For example, a two-dimensional barcode may be inserted into a content item by matching the color of the barcode to be close to, but not exactly the same as, the color of the content item. For example, a two-dimensional barcode can be inserted into a content item by overlaying the barcode as a watermark that is only one shade value lighter or darker than the pixels of the content item that the pixels of the barcode overlay. As another example, if a content item has a white space whose hexadecimal color code is "#FFFFFF," a two-dimensional barcode can be inserted into the white space by selecting a color code of "#FFFFFE", "#FEFFFF," "#FFFEFF," etc., for the barcode. Accordingly, in some embodiments, image processing module 112 may process pixel image values to detect the presence of graphical indicators that contain key values.

In some embodiments, image processing module 112 may use a trained machine learning model to identify graphical indicators in content items. In particular, a machine learning algorithm, such as a pattern recognition model, a deep learning model (e.g., a deep neural network, a convolutional neural network, and the like, may be trained to identify and extract graphical indicators from content items. In some embodiments, key values are inserted into content items as metadata. Additionally or alternatively, key values can be inserted into content items using steganographic-based approaches (e.g., hiding data.

Content tracking module 114 manages downstream control of content items by using the key values obtained from content items to perform database queries in order to retrieve details relating to the content items, such as the identity of the content author and/or the any indications that content items have been updated. The key values may be obtained by image processing module 112, which in turn may obtain images of content items from collaboration server 118 and/or from any of endpoint devices 128A-128N. In various embodiments, content tracking module 114 may perform one or more actions in response to detecting that content items are being used by a user other than the content author. In some embodiments, content tracking module 114 updates the database (e.g., database 116) maintained by content management module 110 (or causes content management module 110 to update the database) with data regarding the usage of a content item. The usage data (e.g., consumption data) can include identities of other users who have viewed or otherwise interacted with a content item, and can include data such as user dwell time, user edits to a content item, identities of other users that a particular user has provided with copies of the content item, and the like. This usage data can then be provided to the original content author so that the content author can determine which content items are popular with particular users, etc.

In some embodiments, content tracking module 114 consults a database (e.g., database 116) to determine whether a content item has been updated. Content tracking module 114 can compare a timestamp of a copied content item to the entry of the content item in the database to determine whether the content item was copied prior to the original content author updating the content item. If the copied content item is indeed outdated, then content tracking module 114 can perform one or more operations. In some embodiments, content tracking module 114 notifies the user that the user's copy of the content item is outdated. In some embodiments, the content author can be notified, who may then contact the user of the outdated copy, if desired. In some embodiments, content tracking module 114 may retrieve a copy of the updated content item and the user may be prompted as to whether the user would prefer to receive the updated content item at the user's endpoint device. In some embodiments, content tracking module 114 may automatically replace the outdated content item with an updated content item, and may optionally notify the user that the replacement occurred. For example, when a user joins a collaboration session hosted by collaboration server 118 and begins to present a document that includes an outdated content item, content tracking module 114 may detect the outdated content item, and prompt the user or automatically replace the content item so that the presentation may seamlessly proceed with the most up-to-date versions of content items.

Database 116 may include any non-volatile storage media known in the art. For example, database 116 can be implemented with a tape library, optical library, one or more independent hard disk drives, or multiple hard disk drives in a redundant array of independent disks (RAID). Similarly, data in database 116 may conform to any suitable storage architecture known in the art, such as a file, a relational database, an object-oriented database, and/or one or more tables. Database 116 may store associations between key values for content items and the identities of content authors. In some embodiments, database 116 may store data corresponding to content items themselves. Additionally or alternatively, database 116 may store user identities of any users who have been detected consuming content items, and/or database 116 may store indications that content items have been updated by their content authors.

Collaboration server 118 includes a network interface (I/F) 120, at least one processor 122, and memory 124, which stores software instructions for session hosting module 126. Collaboration server 118 may include, for example, a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 120 may include one or more network interface cards, line cards, etc., and enables components of collaboration server 118 to send and receive data over a network, such as network 140. In general, collaboration server 118 hosts collaboration sessions in which content items may be shared in accordance with present embodiments. Collaboration server 118 may include internal and external hardware components, as depicted and described in further detail with respect to FIG. 12.

In some embodiments, one or more functions of collaboration server 118 and/or session hosting module 126 are performed at, or combined with, functions of content management server 102, including functions performed by content management module 110, image processing module 112, and/or content tracking module 114. Accordingly, while the embodiment depicted in environment 100 of FIG. 1 depicts content management server 102 and collaboration session server 18 as separate entities, it should be appreciated that in some embodiments, the functionality may be combined as desired in order to perform various content management operations by a same computing system that performs collaboration session hosting operations.

Session hosting module 126 may include one or more modules or units to perform various functions of the embodiments described below. Session hosting module 126 may be implemented by any combination of any quantity of software and/or hardware modules or units, and may reside within memory 124 of collaboration server 118 for execution by a processor, such as processor 122.

Session hosting module 126 may initiate collaboration sessions (e.g., video conferences, etc.) between participants so that one or more users can share data, including video data, audio data, and/or data corresponding to content items, with the other participants. Session hosting module 126 may communicate with content tracking module 114 of content management server 102 to provide content tracking module 114 with data including content items and/or key values of content items, identities of users participating in a given current or scheduled collaboration session, other contextual details (e.g., dwell time of content items during a presentation), and any other data that is relevant for managing content items in accordance with present embodiments. Accordingly, session hosting module 126 can support the management of content items by informing content management server 102 and its components of any content items being presented in a collaboration session.

Additionally, session hosting module 126 may perform any operations related to the hosting of collaboration sessions, including transmitting data between participants, arranging for the exchange of data between participants (e.g., in a peer-to-peer approach), initiating collaboration sessions, inviting users to collaboration sessions, permitting or denying users access to a communication session, and the like.

Endpoint devices 128A-128N may each include a network interface (I/F) 130, at least one processor 132, and memory 134. Memory 108 stores software instructions for a client module 136 and optionally, an authoring module 138. Endpoint devices 128A-128N may include, for example, a laptop computer, a tablet computer, a netbook computer, a personal computer (PC), a desktop computer, a personal digital assistant (PDA), a smart phone, a thin client, or any programmable electronic device capable of executing computer readable program instructions. Network interface 130 may include one or more network interface cards, line cards, etc., and enables components of each endpoint devices 128A-128N to send and receive data over a network, such as network 140. In general, endpoint devices 128A-128N may enable users to participate in collaboration sessions in order to consume content, may enable users to author or update content items, and/or may enable users to view consumption details of their authored content items. Endpoint devices 128A-128N may include internal and external hardware components, as depicted and described in further detail below with respect to FIG. 12.

Endpoint devices 128A-128N may include one or more modules or units to perform various functions of the embodiments described below. Endpoint devices 128A-128N may be implemented by any combination of any quantity of software and/or hardware modules or units, and may reside within memory 134 of any of endpoint devices 128A-128N for execution by a processor, such as processor 132.

Client module 136 may include a client for initiating and/or participating in collaboration sessions (e.g., sessions hosted by session hosting module 126). As such, client module 136 may utilize any known or other communication protocols to exchange data between endpoint devices 128A-128N during a collaboration session, including audio data, video data, text data, content item data, and/or other data. Client module 136 may obtain an identity of a user of each endpoint device 128A-128N in order to provide content management server 102 and/or collaboration server 118 with the identities of participants in order to support the practice of embodiments presented herein. In some embodiments, client module 136 may collect contextual data, such as dwell times for content items.

Authoring module 138 enables a user of an endpoint device, such as endpoint device 128A, to author content that can be managed in accordance with present embodiments. Authoring module 138 may include a plug-in that is provided to an editor such as a word processing application, slideshow presentation application, image processing application, and the like. Authoring module 138 may only be necessary for a content author or other user who is concerned about downstream management of content, so that a key can be associated with a content item by a content author, whereas a content consumer may not need to have specialized software installed.

Authoring module 138 enables a user to generate and edit content items, and to request keys to be associated with content items. In particular, when a content author requests to have a key associated with a content item, the request is transmitted to content management module 110 of content management server 102, whereupon a key is associated with the content item, and the association between the key, content item, and/or content author is stored. The key value may be provided back to the requesting content author's authoring module 138, which may insert a graphical indicator encoding the key value into the content item, or may store the content key as metadata, etc. In some embodiments, content management module 110 generates and inserts a graphical indicator into a content item, and provides the content item back to authoring module 138.

Network 140 may include a local area network (LAN), a wide area network (WAN) such as the Internet, or a combination of the two, and includes wired, wireless, or fiber optic connections. In general, network 140 can be any combination of connections and protocols known in the art that will support communications between content management server 102, collaboration server 118, and/or endpoint devices 128A-128N via their respective network interfaces in accordance with the described embodiments.

Figure 2:
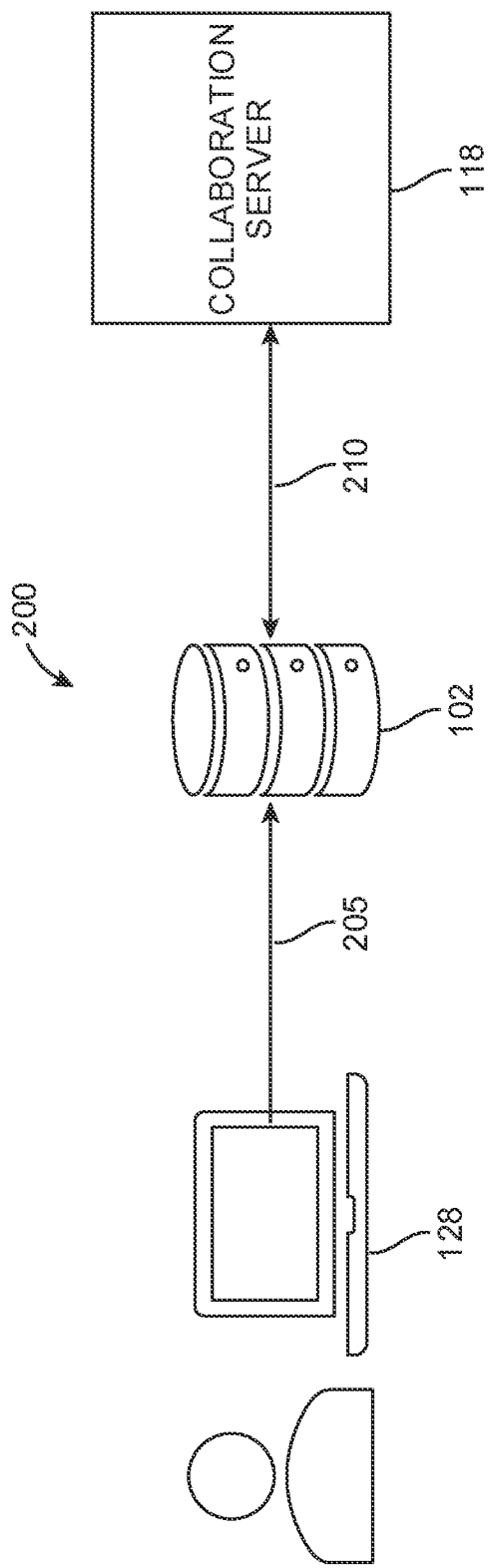
FIG. 2 is a diagram depicting a workflow for managing content items, in accordance with an example embodiment.

Reference is now made to FIG. 2. FIG. 2 is a diagram depicting a workflow 200 for managing content items, in accordance with an example embodiment. As depicted, a content author using endpoint device 128 may upload details about their content, as indicated by arrow 205. The content author may initially create content at endpoint device 128, and may use a plug-in or other application (e.g., authoring module 138) to request that the content item be managed by content management server 102, as indicated by arrow 205. Content management server 102 may accordingly register the content item by associating the content item with the content author and associating a key with the content item, which may be returned to the content author. Content management server 102 may further manage the content item by tacking details of any other owners of a content item (e.g., in the case that two or more individuals collaborated on a single content item), versions of a content item, identities of users who presented or viewed the content item, and the like.

When the content item is presented in a collaboration session, such as including the content item in a slideshow presentation, collaboration server 118 may inform content management server 102, as indicated by arrow 210. In particular, collaboration server 118 may recognize a content item's graphical indicator that encodes the key value for the content item. Collaboration server 118 may provide data to content management server 102 using an application programming interface (API) or similar mechanism in order to inform content management server 102 that the content item is being presented. Similarly, collaboration server 118 can inform content management server 102 of any participants in the collaboration session, including the identities of the present and/or viewers.

Figure 3B:
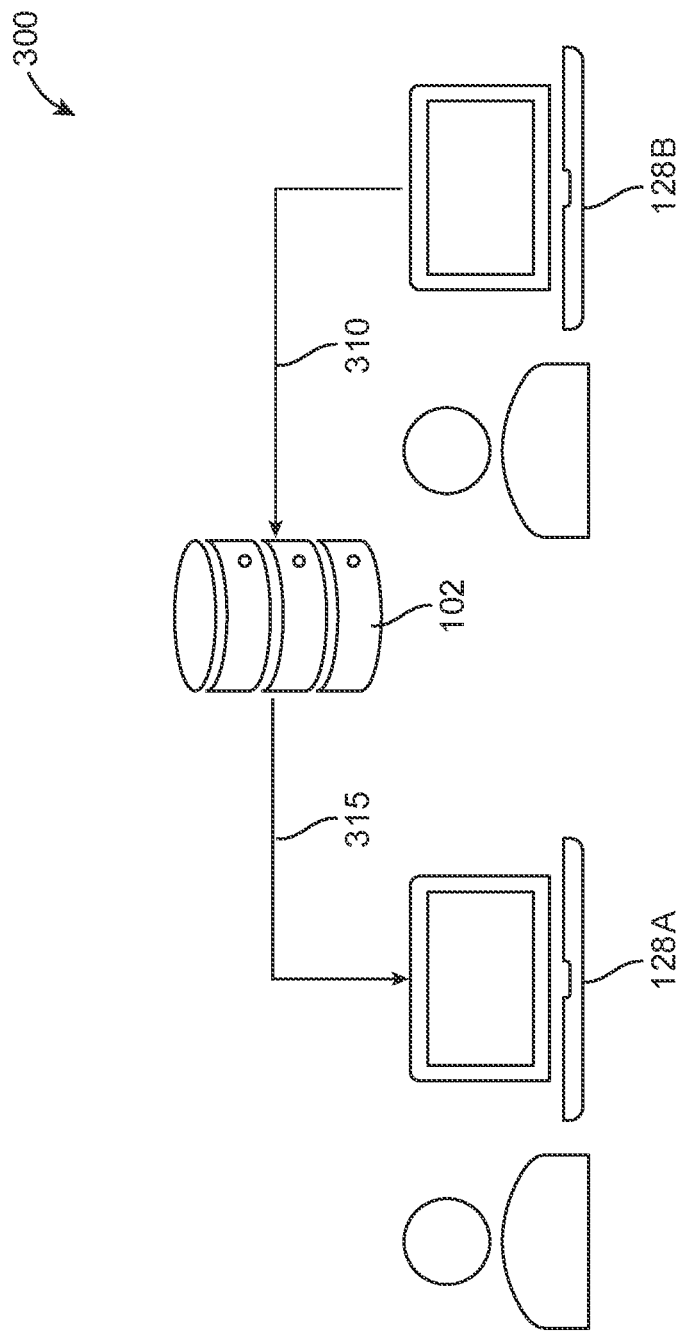

FIGS. 3A and 3B are diagrams depicting a workflow 300 for managing copied content items, in accordance with an example embodiment. With reference to FIG. 3A, workflow 300 includes an endpoint device 128A and content management server 102. Initially, the content author creates a content item and registers the content item with content management server 102, as indicated by arrow 305. Thus, the content item may be registered in a centralized manner that enables tracking of copies of the content item by the key value that content management server 102 associates with the content item.

Turning now to FIG. 3B, workflow 300 now includes another user that may access the content item via endpoint device 128B. The content author may make the content item available to other users by emailing the content item, uploading to a shared network-accessible location, presenting the content item to other users, and the like. When the user of endpoint device 128B copies the content item from one document to another, the key that is associated with the content item is copied as well (as the key may be encoded as a graphical indicator that is associated with the content item). Content management server 102 may be notified that the content item has been copied, as indicated by arrow 310. In some embodiments, endpoint device 128B includes a plug-in or other software module (e.g., authoring module 138) that detects the copied content by its associated key. In other embodiments, content management server 102 detects the presence of the copied content when the user of endpoint device 128B shares the content in a communication session, by email, or by any other action that passes through a server capable of detecting keys of content items. Content management server 102 may then notify the original author that the content item has been copied, as indicated by arrow 315. Additionally, content management server 102 may provide details relating to how the content item has been used, including user dwell time on the content item, the name or file type of the document into which the content item has been copied, the date and time of the copying, and the like.

Figure 4:
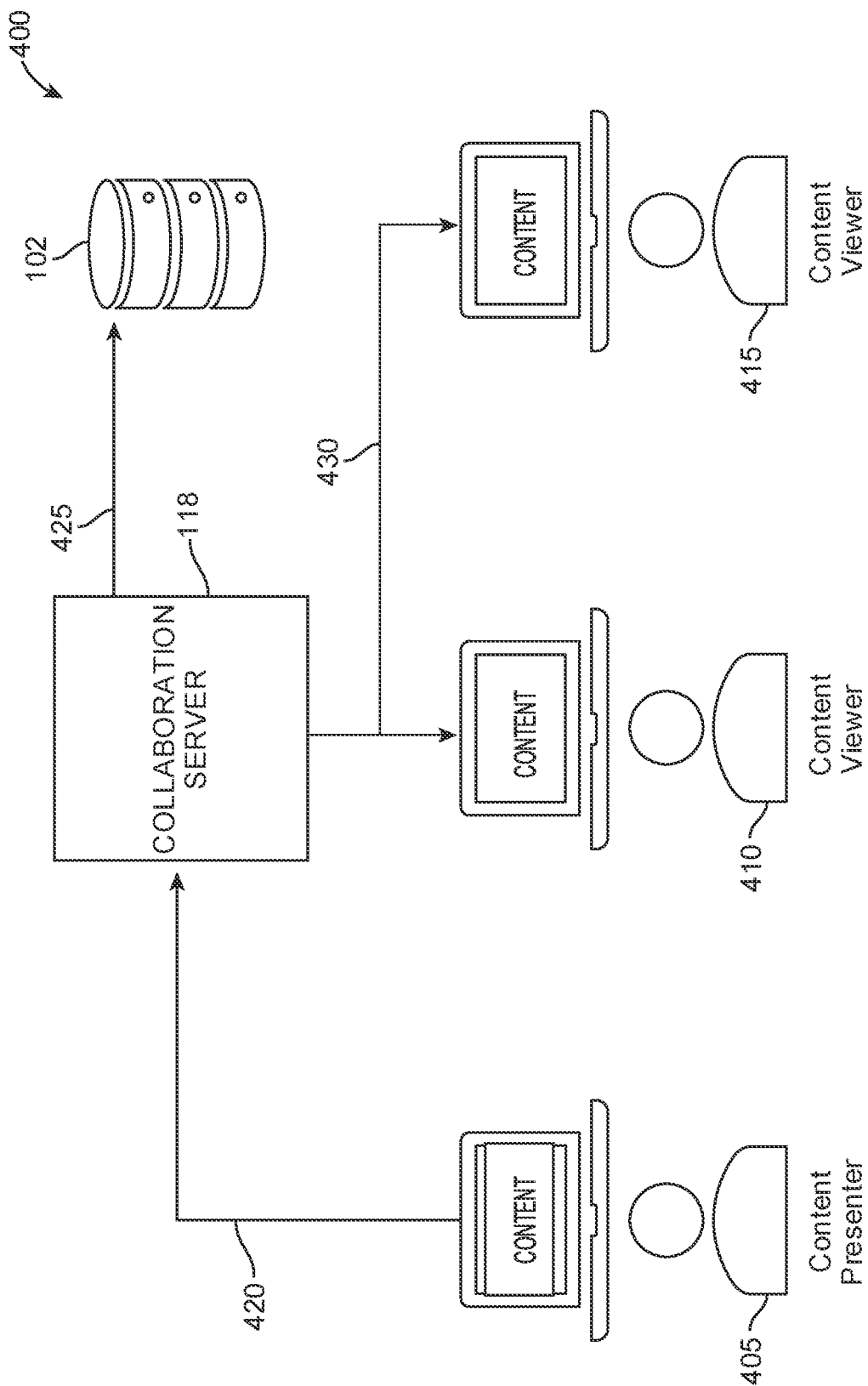
FIG. 4 is a diagram depicting a workflow for managing content items that are shared during a communication session, in accordance with an example embodiment.

Now with reference to FIG. 4, a diagram is provided depicting a workflow 400 for managing content items that are shared during a communication session, in accordance with an example embodiment. As depicted, a content presenter 405 presents content in a collaboration session joined by content viewer 410 and content viewer 415; the collaboration session may be hosted by collaboration server 118. As indicated by arrow 420, content presenter 405 initially uploads data to be presented, including one or more content items, to collaboration server 118. Collaboration server 118 may then detect the presence of any content items that are registered with content management server 102 by identifying the keys that are associated with the content items. Collaboration server 118 may thereupon extract key values from the content and provide the key values to content management server 102, along with other details, as indicated by arrow 425. In addition to the key values, collaboration server 118 may include the identities of the participants (e.g., content viewer 410 and content viewer 415), dwell times on particular content items during the presentation, and the like. Additionally, collaboration server 118 hosts the collaboration session by providing the shared content to content viewers 410 and 415, as indicated by arrow 430.

Figure 5A:
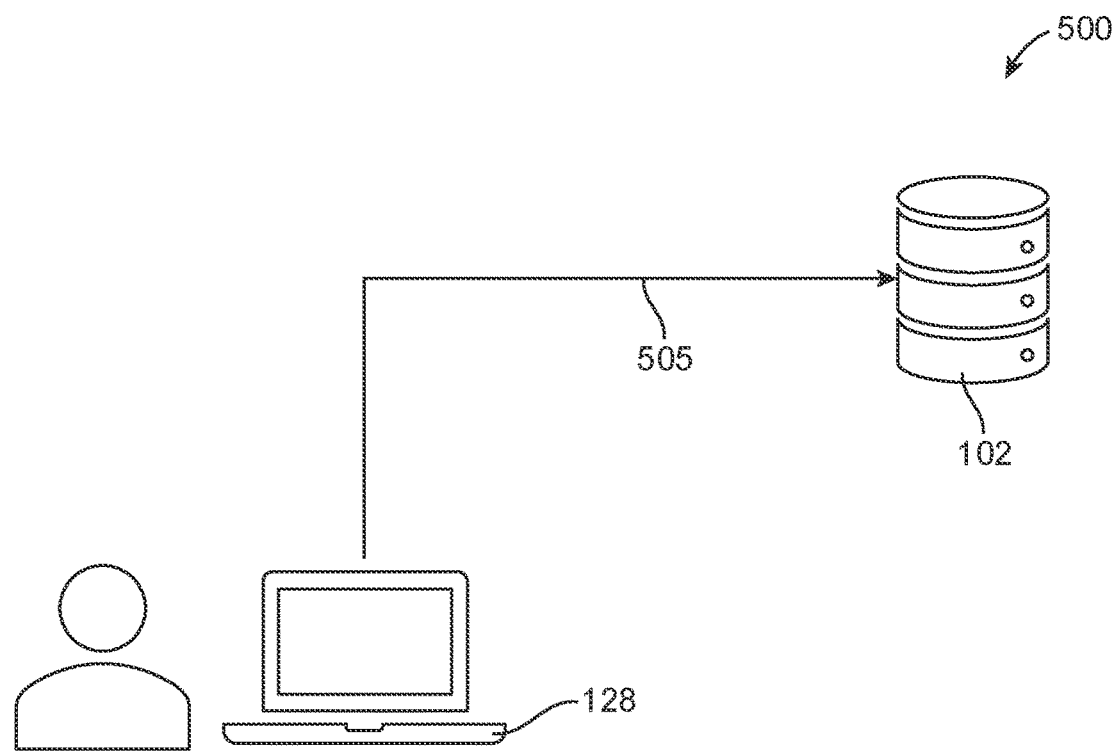
FIGS. 5A and 5B are diagrams depicting a workflow of a content author managing a content item, in accordance with an example embodiment.
Figure 5B:
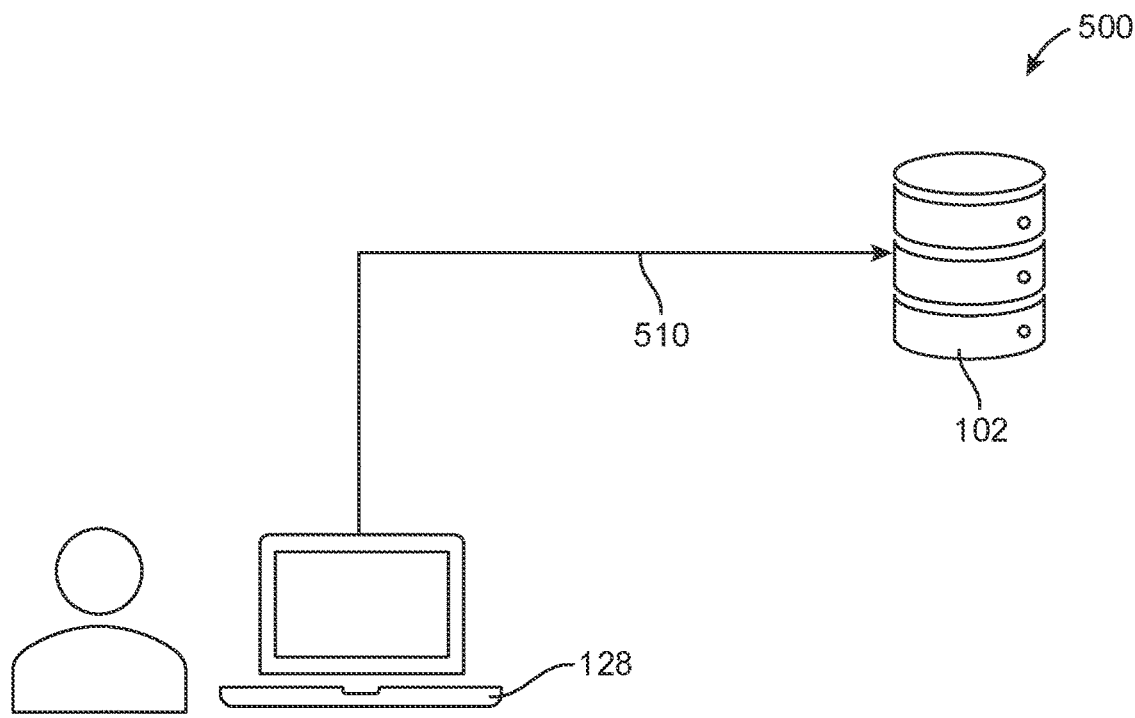

With reference now to FIGS. 5A and 5B, a workflow 500 of a content author managing a content item is depicted in accordance with an example embodiment. As shown in FIG. 5A, a user of endpoint device 128, who is a content author, logs into content management server 102, as indicated by arrow 505. The user may receive at endpoint device 128 any data that content management server 102 has associated with the user's content item, including data regarding the usage of the content item. The usage data can include identities of other users who have viewed or otherwise interacted with a content item, and can include data such as user dwell time, user edits to a content item, identities of other users that a particular user has provided with copies of the content item, and the like. Accordingly, the user can access usage data in order to identify trends or patterns in the consumption of any content items created by the user. In some embodiments, the usage data may provide a content author with usage data according to a particular schedule (e.g., every week, every month, etc.). In some embodiments, the usage data may be provided to the content author on an ad hoc basis (e.g., when new usage data becomes available). Accordingly, a content author can analyze the usage data to determine where to focus their efforts and/or to determine where their content may require improvement.

Now with reference to FIG. 5B, the content author may additionally manage a content item by providing an updated version of the content item to content management server 102, as indicated by arrow 510. A plug-in or other software module (e.g., authoring module 138) may inform content management server 102 that the content item has been updated, and may provide a time and date of the update. In order to maintain downstream control of all copies of a content item, the content management server 102 may store an indication that the content item was updated; however, the original key is retained and may remain associated with the updated content item. Thus, content management server 102 may identify outdated content items based on timestamps associated with the copied content items.

Figure 6:
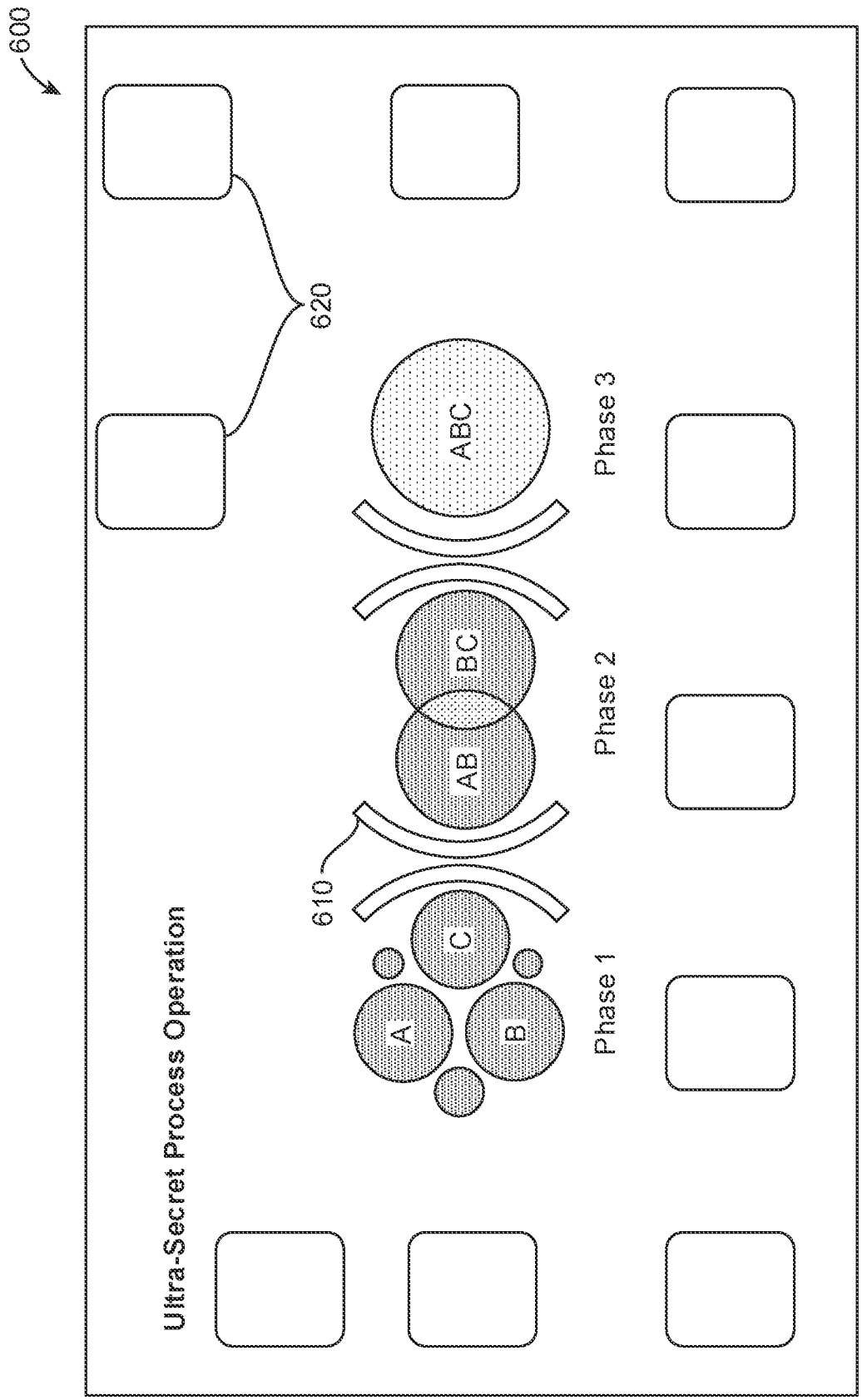
FIG. 6 depicts a view of a user interface including two-dimensional barcode locations, in accordance with an example embodiment.

FIG. 6 depicts a view of a user interface 600 including two-dimensional barcode locations, in accordance with an example embodiment. As depicted, user interface 600 shows an example of a slide of a presentation or page of a document in which a content item 610 is present. As shown by bounding boxes 620, a plurality of two-dimensional barcode locations are indicated. However, each two-dimensional barcode, despite being machine-readable, may not be visually observable by a user due to a transparent quality of each barcode. Accordingly, whenever the content item is shared, either as a file or as a view of a user interface, the two-dimensional barcodes will be included, thus enabling content items to be tracked in accordance with present embodiments. In the depicted embodiment, several redundant copies of the barcode are provided so that the key may be retried when even a portion of the current view is observable.

It should be appreciated that multiple content items can be included in a single document in various ways. Content items can correspond to pages of a document, paragraphs of a document, particular in-line images or graphs, slides in a slideshow presentation, particular images, graphs, or other media in a particular slide of a slideshow presentation, and the like. Accordingly, content items are not necessarily document-level items, but can refer to any content at any level of granularity within any document or other data type.

Figure 7A:
FIGS. 7A and 7B depict two-dimensional barcodes, in accordance with example embodiments.
Figure 7B:
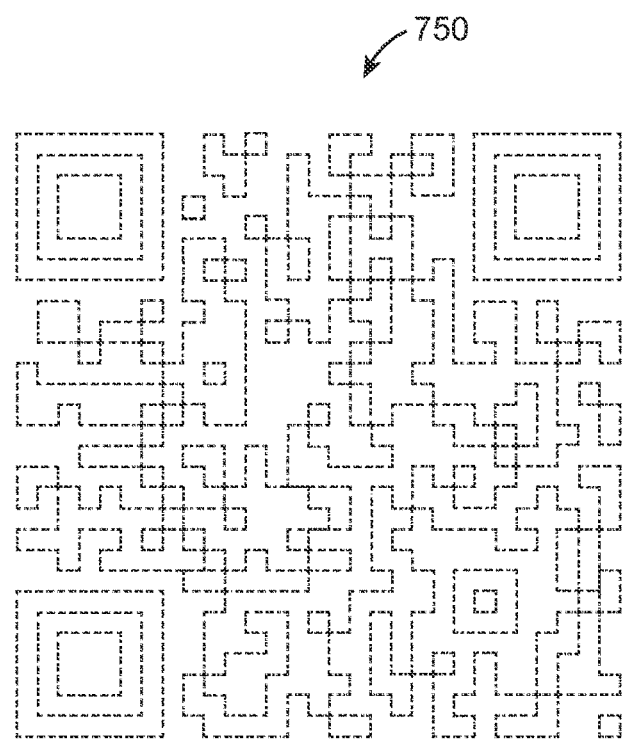

FIGS. 7A and 7B depict two-dimensional barcodes 700 and 750, in accordance with example embodiments. FIG. 7A depicts a two-dimensional barcode 700, which is used to encode a key value that can be used to retrieve details relating to content item (e.g., the identity of the content author, the existence of updates, etc.). The two-dimensional barcode may be a matrix barcode such as a quick response (QR) code or other such format. In various embodiments, other approaches to encoding data visually may be employed, such as a one-dimensional barcode or conventional or other watermarking techniques.

Turning now to FIG. 7B, a barcode 750 is depicted, shown as a dotted outline to indicate that barcode 750 has been made sufficiently transparent such that a human eye may not observe the barcode. As depicted, the outline of barcode 750 is shown with dotted lines for clarity; however, it should be understood that the dotted lines would not be included when barcode 750 is inserted into or adjacent to a content item. The pixels of barcode 750 may be a uniform color if inserted into a uniformly-colored portion of a content item, or the pixels may be various colors to enable barcode 750 to blend in with a portion of a content item without being readily visible to a user. However, barcode 750 may be graphically inserted into or adjacent to a content item so that barcode 750 is detectable by image processing techniques.

Figure 8A:
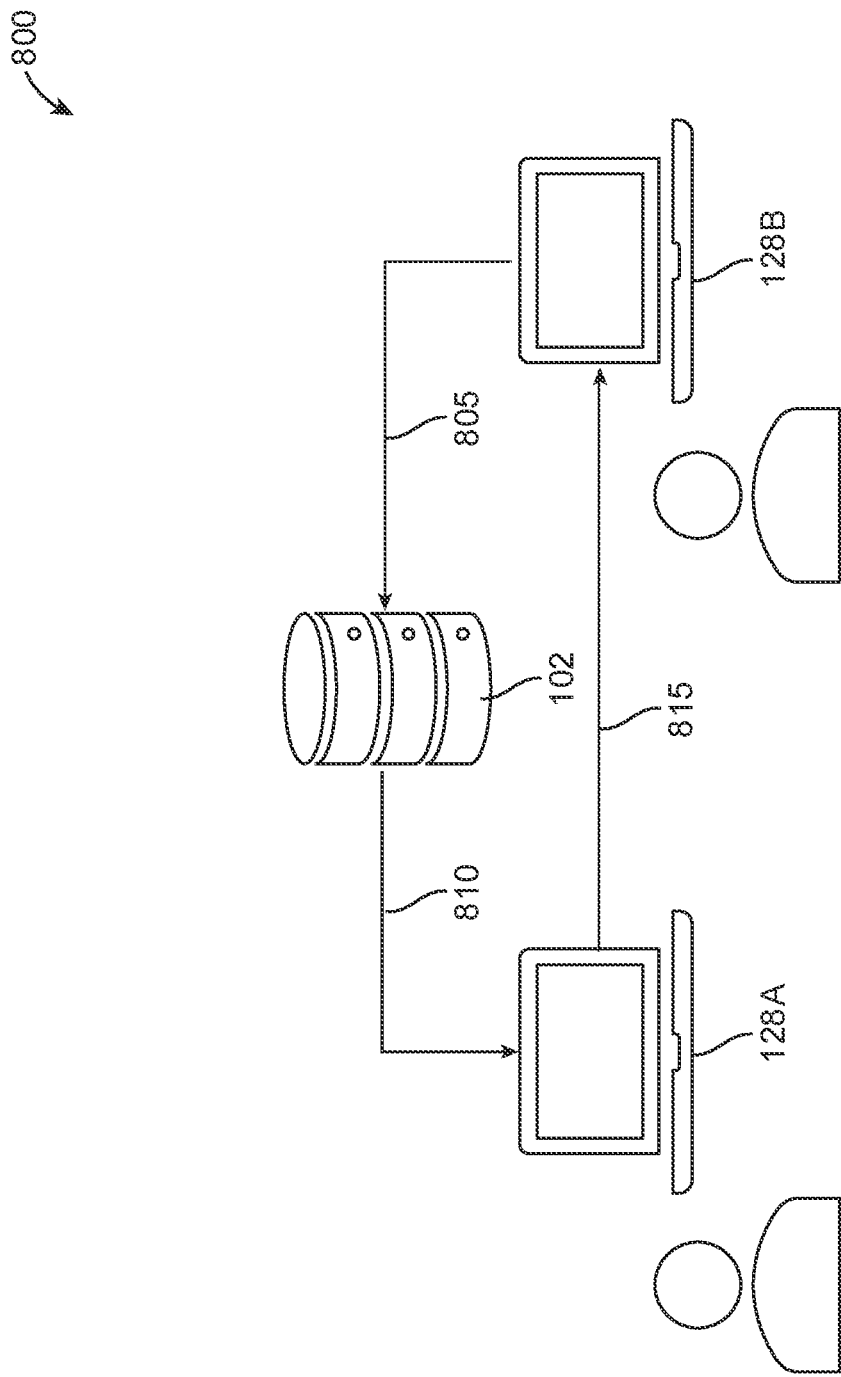
FIGS. 8A and 8B are diagrams depicting a workflow for updating content items, in accordance with example embodiments.
Figure 8B:
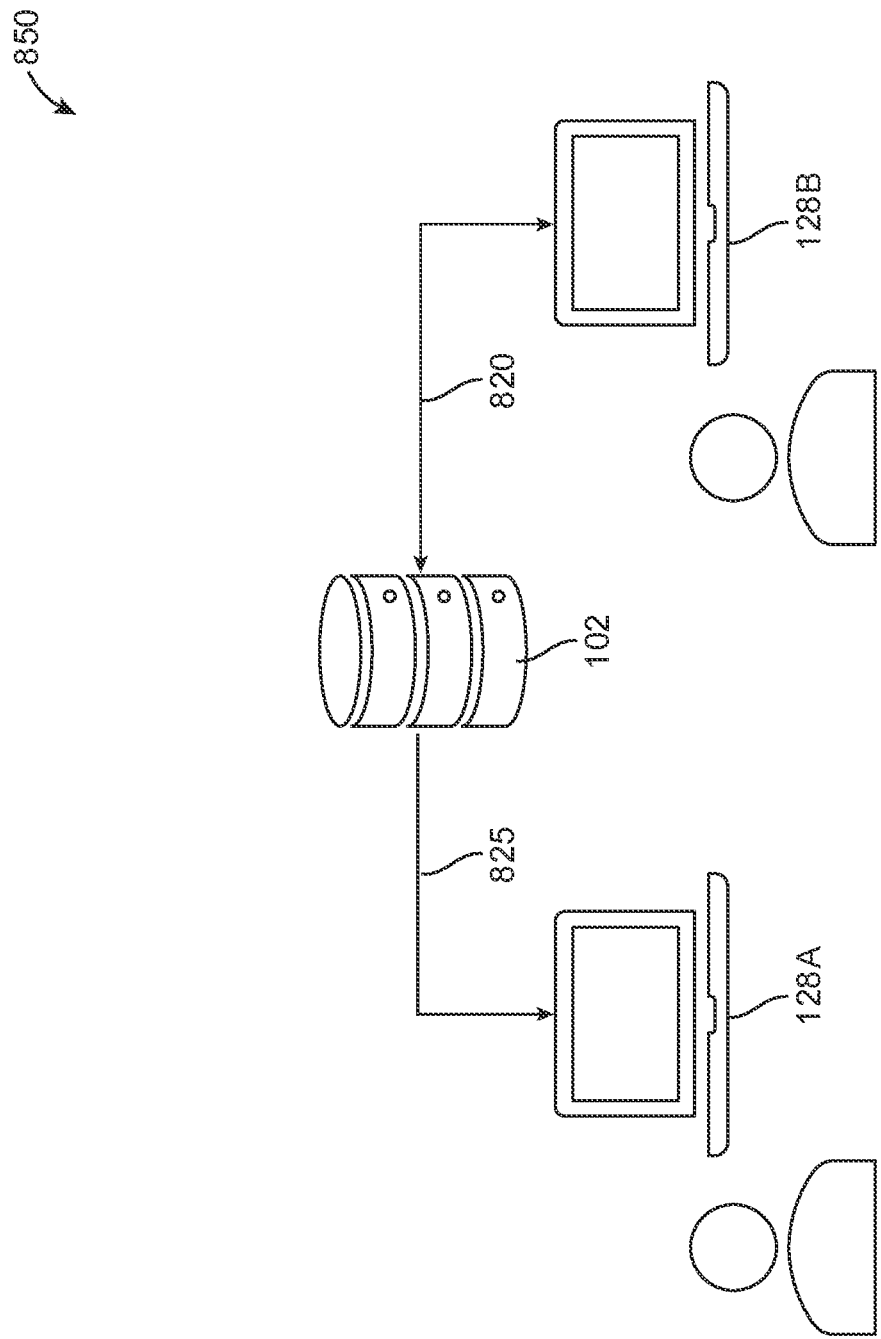

FIGS. 8A and 8B are diagrams depicting workflows 800 and 850 for updating content items, in accordance with example embodiments. As depicted in workflow 800 of FIG. 8A, a user of endpoint device 128B may attempt to copy a content item that is outdated. Endpoint device 128B may notify content management server 102 of the presence of the content item locally at endpoint device 128B, as indicated by arrow 805. Once content management server 102 determines that the content item of endpoint device 128B is an outdated version, content management server 102 may notify the content author by transmitting a notification, indicated by arrow 810, to the content author's device (e.g., endpoint device 128A). Then, the content author may reach out to the other user via email or another form of communication, indicated by arrow 815, to alert the other user that the user's version of the content item is an outdated version.

Turning now to FIG. 8B, workflow 850 is shown in an embodiment in which outdated content is remediated by automatically addressing the user who copied the outdated content. Initially, a user of endpoint device 128B may attempt to copy a content item that is outdated. Endpoint device 128B may notify content management server 102 of the presence of the content item locally at endpoint device 128B, as indicated by arrow 820. Once content management server 102 determines that the content item of endpoint device 128B is an outdated version, content management server 102 may automatically provide the updated content to the user of endpoint device 128B and/or may notify the user of endpoint device 128B that the content is outdated. Additionally, the content author may be notified that another user has attempted to use outdated content, as indicated by arrow 825. Accordingly, if an outdated content item is frequently used, the content author may take additional actions, such as emailing a team to inform them that an updated version exists, etc.

Figure 9:
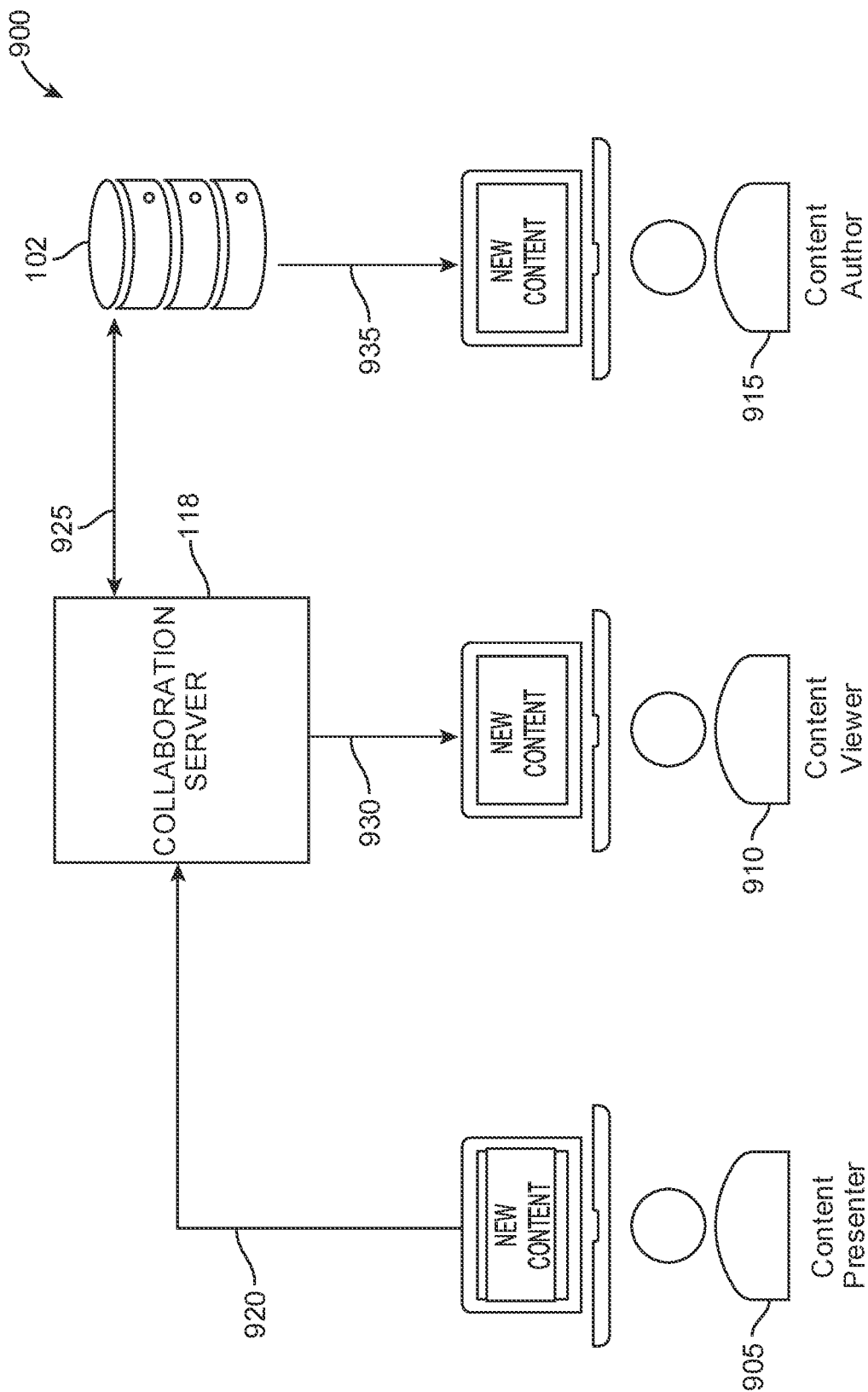
FIG. 9 is a diagram depicting a workflow for updating a content item, in accordance with example embodiments.

FIG. 9 is a diagram depicting a workflow 900 for updating a content item, in accordance with example embodiments. In the depicted embodiment, rather than detecting outdated content on a user's endpoint device, an outdated content item may be detected when a user attempts to present the outdated content item during a collaboration session. Initially, a content presenter 905 may attempt to present an outdated content item to one or more participants in a collaboration session (e.g., content viewer 910) by uploading the content item to collaboration server 118, as indicated by arrow 920. Collaboration server 118 may identify the presence of any content items, including the outdated content item, by their keys, and may provide a request to content management server 102, as indicated by arrow 925. Content management server 102 may execute the request by performing database queries for each identified content item to determine whether an update for that content item exists; if so, then content management server 102 may reply to inform collaboration server of the presence of an updated version of the content item, and/or may provide a copy of the updated content item to collaboration server 118. Accordingly, collaboration server 118 may automatically replace the outdated content item with the updated content item, and may then transmit the presentation data to content viewer 910, as indicated by arrow 930. In some embodiments, content management server 102 may inform the content author 915 that a user attempted to present an outdated version of a content item, as indicated by arrow 935.

Figure 10:
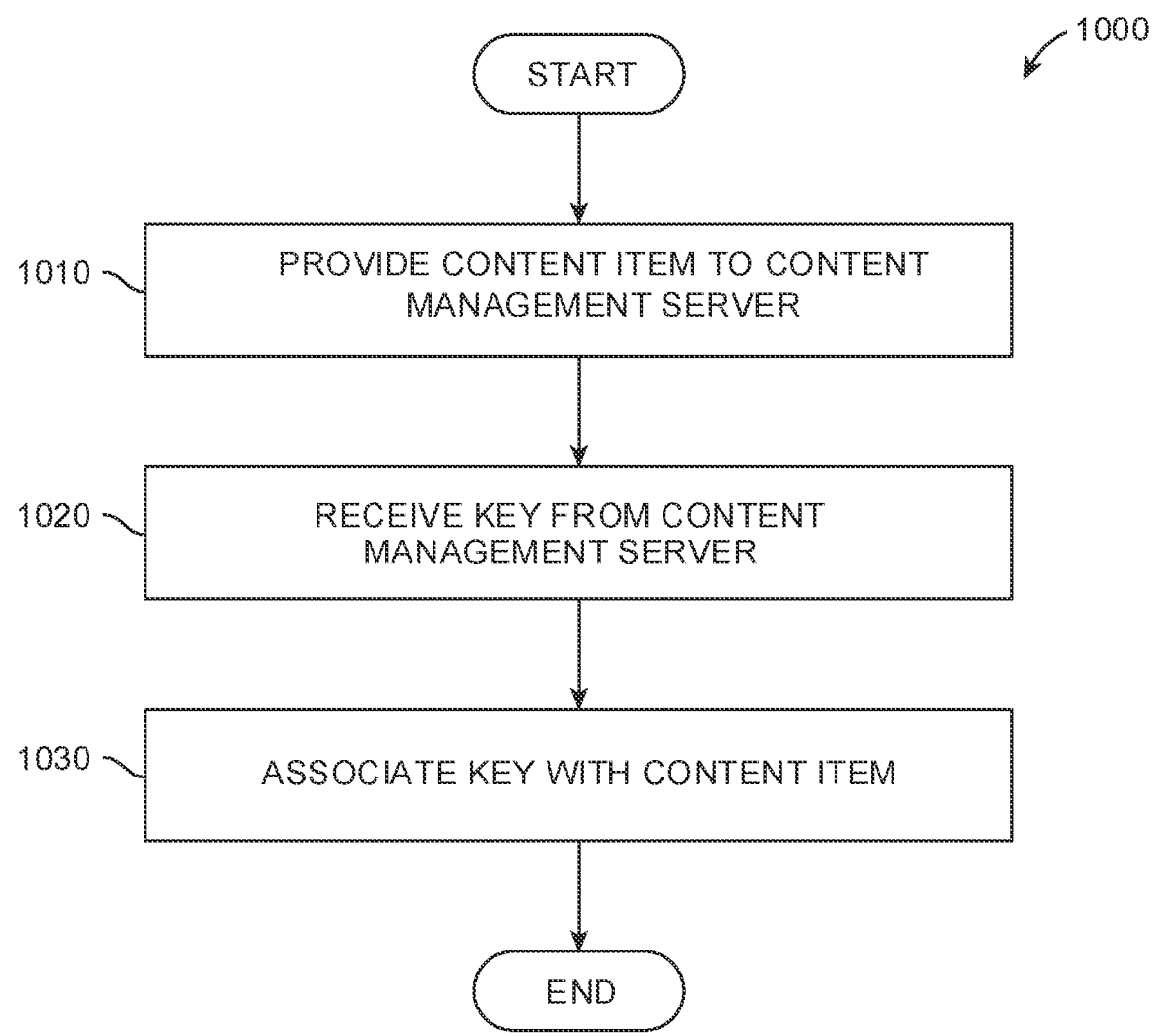
FIG. 10 is a flow chart depicting a method for associating a key with a content item, in accordance with an example embodiment.

FIG. 10 is a flow chart depicting a method 1000 for associating a key with a content item, in accordance with an example embodiment.

A content item is provided to a content management server at operation 1010. Initially, an author creates a content item, which can include any text-based and/or media-based items. As non-limiting examples, content items may include a word or phrase, a paragraph of text, an image, a graph, a video and/or audio sample, an executable set of program instructions, a hypertext markup language (HTML) file, an email, and the like. After the content author creates the content item, the author may request that the content item be registered with a key by providing the content item to a content management server (e.g., content management server 102). The request may be performed by a plug-in or other software component installed on the content author's endpoint device. In some embodiments, the content item itself is also provided to the content management server along with the request.

A key is received from a content management server at operation 1020. The content management server receives the content item's details (e.g., the identity of the author, data corresponding to the content item, etc.), stores the content item's details, and associates a key with the content item's details. The value of the key may accordingly be used to retrieve the content item's details from a database managed by the content management server. The key may be returned to the endpoint device of the content author, either in the form of data indicating the key value, or a graphical indicator encoding the key value.

The key is associated with the content item at operation 1030. A graphical indicator encoding the key value may be inserted over or adjacent to the content item, thereby associating the content item with the key. If a graphical indicator is not received, then the endpoint device of the content author may generate a graphical indicator that encodes the key value. Alternatively, in some embodiments the key value may be stored as metadata that is associated with the content item. Accordingly, whenever the content item is transmitted, copied, or presented visually, the key may be obtained from the content item and usage of the content item can accordingly be tracked. Further, when an author or other user subsequently modifies the content item, other users using the content item can be notified. In some embodiments, a role-based access control policy or similar policy may be enforced (e.g., by content management server 102) to prevent direct read and/or write access to content by non-authors. In particular, access to an original copy of a content item may be restricted to only the author of the content item, so that other users who copy and subsequently modify a content item do not cause the original version of the content item to be edited. Accordingly, other users may be notified that a newer version of a content item is available, and can download the new version, request permission to obtain the new version, and the like.

Figure 11:
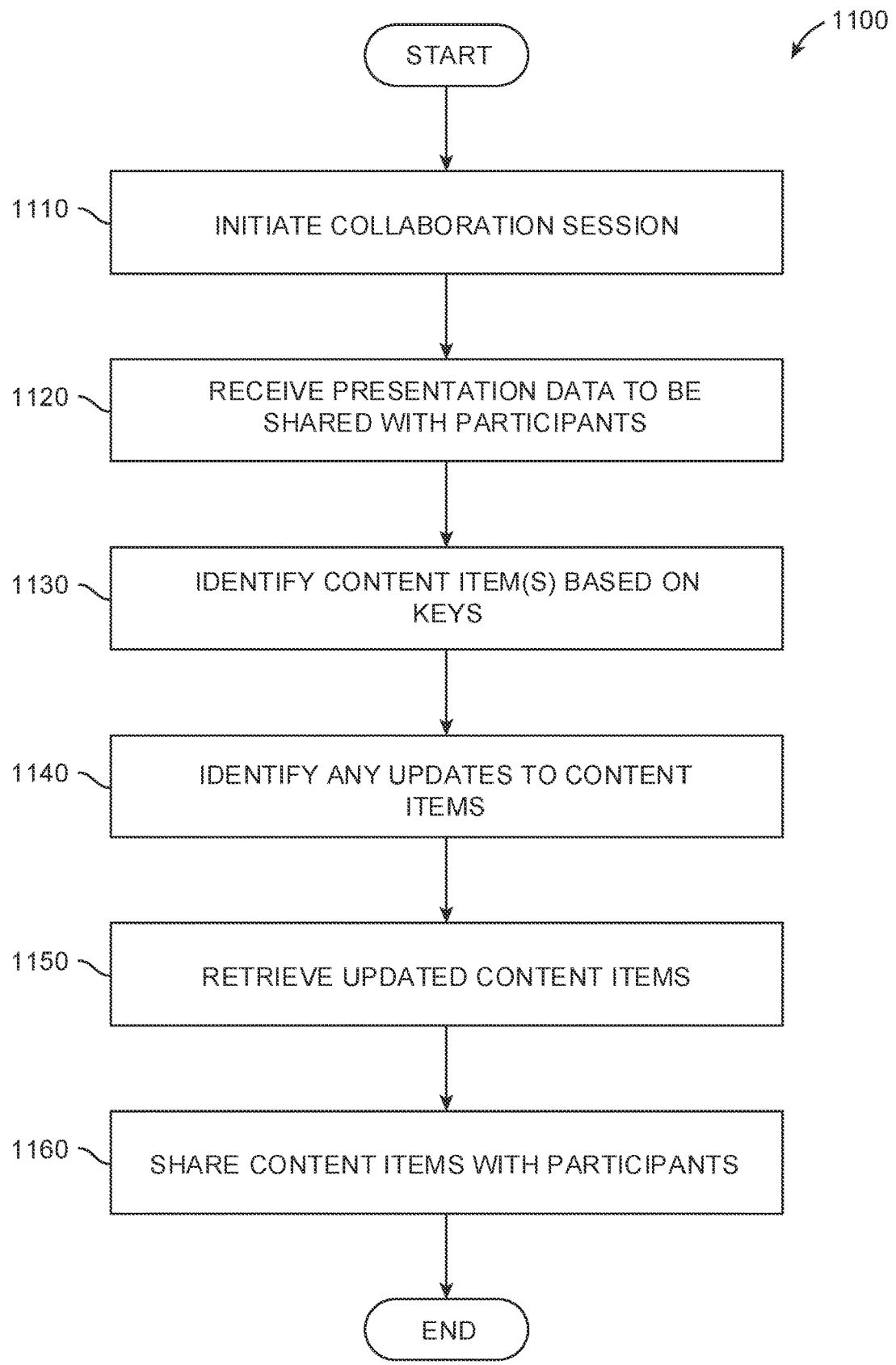
FIG. 11 is a flow chart depicting a method for managing a content item, in accordance with an example embodiment.

FIG. 11 is a flow chart depicting a method 1100 for managing a content item, in accordance with an example embodiment.

A collaboration session is initiated at operation 1110. Initially, a host may transmit a request to collaboration server 118 to being a collaboration session that other invitees may join. Alternatively, the collaboration session may be prescheduled, and collaboration server 118 may automatically initiate the collaboration session at a particular date and time.

The presentation data that the presenting user desires to share with other participants is received at operation 1120. Initially, the presenting user may request permission to present data, or may simply upload data for presentation to collaboration server 118. The data may be a file, such as a slideshow, or may be a video capture of the presenting user's local user interface.

Any content items included in the presentation data are identified by their keys at operation 1130. Collaboration server 118 may identify keys by inspecting metadata, performing image processing, and the like. In some embodiments, collaboration server 118 provides the presentation data to content management server 102 for inspection and identification of any content items. In any case, content management server 102 may be queried using the key values of content items to determine the identity of the content author, so that usage data can be provided to the content author.

Any updates to the content items are identified at operation 1140. The key values may also be used to identify whether the content author has updated a content item that is included in the presentation data. When a content author updates a content item, an indication of the update may be associated by content management server 102 with the content item's key. Additionally, a copy of the updated version of the content item may be stored by content management server 102.

Copies of the updated content items are retrieved at operation 1150. A copy of the updated version of a content item can be retrieved from a database managed by content management server 102 (e.g., database 116). Alternatively, a request may be transmitted to the content author, who may respond by providing collaboration server 118 with the updated content item.

The updated content items are shared with the participants of the collaboration session at operation 1160. Any updated versions of content items may automatically replace the outdated versions, or collaboration server 118 may prompt the presenter to determine whether or not to use the updated content items. In some embodiments, content is replaced on-the-fly during presentation, whereas in other embodiments, the presentation data may be reviewed a priori to identify and resolve any outdated content items.

Figure 12:
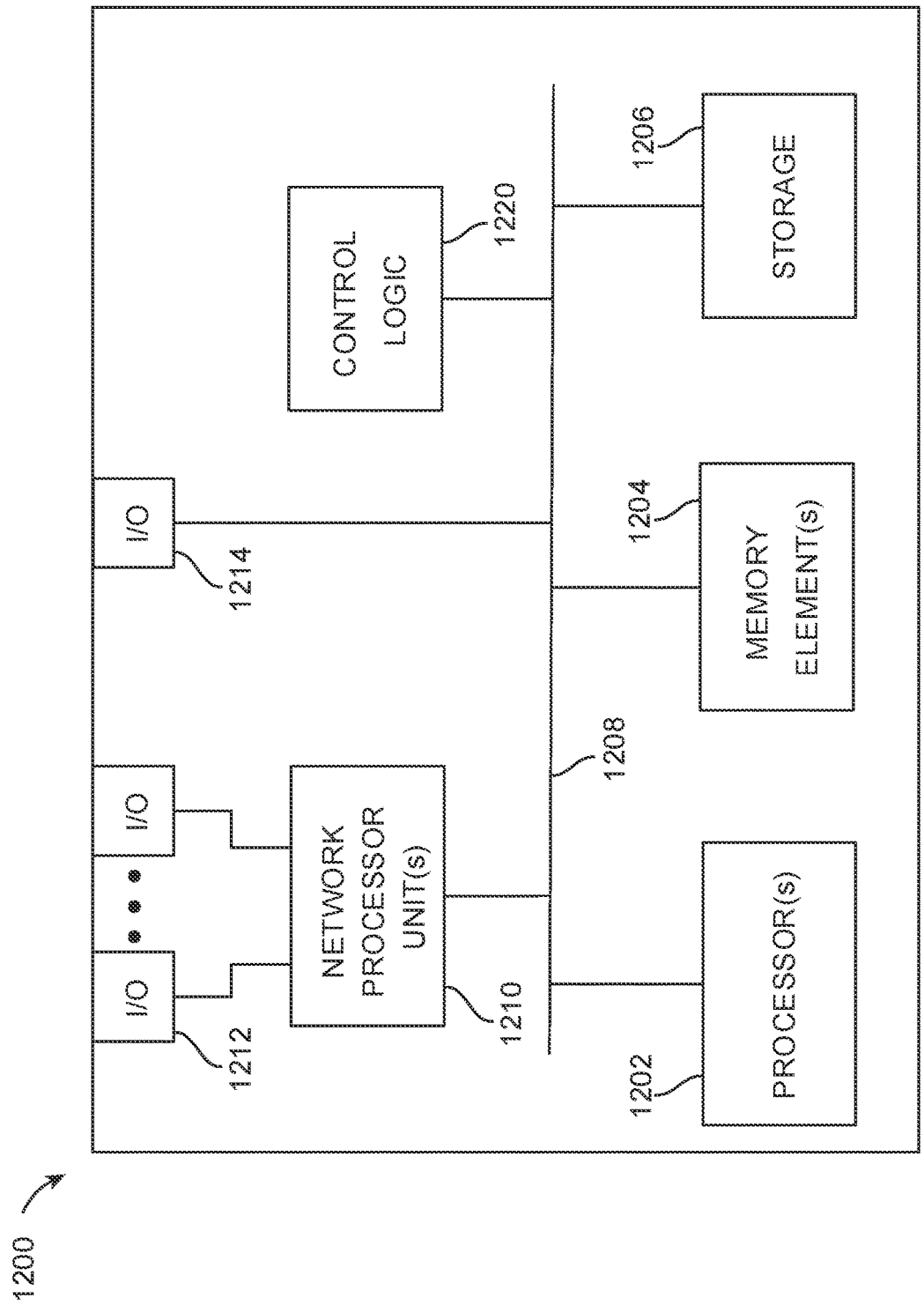
FIG. 12 is a block diagram depicting a computing device configured to manage content items, in accordance with an example embodiment.

Referring to FIG. 12, FIG. 12 illustrates a hardware block diagram of a computing device 1200 that may perform functions associated with operations discussed herein in connection with the techniques depicted in FIGS. 1-11. In various embodiments, a computing device, such as computing device 1200 or any combination of computing devices 1200, may be configured as any entity/entities as discussed for the techniques depicted in connection with FIGS. 1-11 in order to perform operations of the various techniques discussed herein.

In at least one embodiment, the computing device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fibre Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to computing device 1200. For example, I/O interface(s) 1214 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 1202.11 (e.g., Wi-Fi®/Wi-Fi6®), IEEE 1202.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: receiving a content item from an author, associating a key with the content item, identifying, based on the key, that a user is presenting the content item in a communication session, and in response to determining that the author has updated the content item, notifying the user that an updated version of the content item is available for presentation in the communication session.

In another form, notifying the user further comprises automatically providing the updated version of the content item to participants of the communication session.

In another form, the key includes a two-dimensional barcode that is detected via image processing.

In another form, the key remains associated with the content item when the content item is copied or inserted into another document.

In another form, the method further includes in response to determining that the author has updated the content item, identifying one or more users who have copied the content item, and notifying the one or more users that the updated version of the content item is available.

In another form, the method further includes generating user consumption data of the content item based on the key, and providing the user consumption data to the author.

In another form, the key is requested by the author via a plug-in to content authoring software used to author the content item, and wherein the content item and associated key are returned to a device of the author.

In one form, a computer system is provided, comprising: one or more computer processors; one or more computer readable storage media; and program instructions stored on the one or more computer readable storage media for execution by at least one of the one or more computer processors, the program instructions comprising instructions to: receive a content item from an author, associate a key with the content item, identify, based on the key, that a user is presenting the content item in a communication session, and in response to determining that the author has updated the content item, notify the user that an updated version of the content item is available for presentation in the communication session.

In one form, one or more computer readable storage media is provided, the one or more computer readable storage media collectively having program instructions embodied therewith, the program instructions executable by a computer to cause the computer to: receive a content item from an author, associate a key with the content item, identify, based on the key, that a user is presenting the content item in a communication session, and in response to determining that the author has updated the content item, notify the user that an updated version of the content item is available for presentation in the communication session.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a document including a plurality of different content items including a particular content item provided by an author;
   associating a key of a plurality of keys with each content item, wherein each key includes a two-dimensional barcode that is not discernible by human vision and is detected via image processing, wherein the two-dimensional barcode is inserted into the particular content item such that each pixel of the two-dimensional barcode is one hexadecimal color code lighter or darker than a corresponding pixel of the particular content item, and wherein each key corresponds to a different content item of the plurality of different content items of the document;
   identifying, based on a key of the plurality of keys, that a user is presenting the particular content item in a communication session;
   in response to determining that the author has updated the particular content item, notifying the user that an updated version of the particular content item is available for presentation in the communication session;
   generating user consumption data of the particular content item based on a corresponding key, wherein the user consumption data for the particular content item indicates one or more of user edits to the particular content item; and
   providing the user consumption data to an endpoint device of the author.

2. The computer-implemented method of claim 1, wherein notifying the user further comprises automatically providing the updated version of the particular content item to participants of the communication session.

3. The computer-implemented method of claim 1, wherein each key remains associated with a corresponding content item when the corresponding content item is copied or inserted into another document.

4. The computer-implemented method of claim 1, further comprising:
   in response to determining that the author has updated the particular content item, identifying one or more users who have copied the particular content item, and notifying the one or more users that the updated version of the particular content item is available.

5. The computer-implemented method of claim 1, wherein the key of the particular content item is requested by the author via a plug-in to content authoring software used to author the particular content item, and wherein the particular content item and associated key are returned to a device of the author.

6. The computer-implemented method of claim 1, wherein the user consumption data further includes one or more of: identities of one or more users who view the particular content item, identities of other users to whom a particular user has provided copies of the particular content item, and user dwell time on the particular content item.

7. The computer-implemented method of claim 1, wherein providing the user consumption data to the author further comprises providing new usage data to the author in response to the new usage data becoming available.

8. An apparatus comprising:
   one or more computer processors;
   a network interface configured to enable network communications;
   one or more computer readable storage media; and
   program instructions stored on the one or more computer readable storage media for execution by at least one of the one or more computer processors, the program instructions comprising instructions to:
   receive document including a plurality of different content items including a particular content item provided by an author;
   associate a key of a plurality of keys with each content item, wherein each key includes a two-dimensional barcode that is not discernible by human vision and is detected via image processing, wherein the two-dimensional barcode is inserted into the particular content item such that each pixel of the two-dimensional barcode is one hexadecimal color code lighter or darker than a corresponding pixel of the particular content item, and wherein each key corresponds to a different content item of the plurality of different content items of the document;
   identify, based on a key of the plurality of keys, that a user is presenting the particular content item in a communication session;
   in response to determining that the author has updated the particular content item, notify the user that an updated version of the particular content item is available for presentation in the communication session;
   generate user consumption data of the particular content item based on a corresponding key, wherein the user consumption data for the particular content item indicates one or more of user edits to the particular content item; and
   provide the user consumption data to an endpoint device of the author.

9. The apparatus of claim 8, wherein the instructions to notify the user further comprise instructions to automatically provide the updated version of the particular content item to participants of the communication session.

10. The apparatus of claim 8, wherein each key remains associated with a corresponding content item when the corresponding content item is copied or inserted into another document.

11. The apparatus of claim 8, wherein the program instructions further comprise instructions to:
in response to determining that the author has updated the particular content item, identify one or more users who have copied the particular content item, and notify the one or more users that the updated version of the particular content item is available.

12. The apparatus of claim 8, wherein the key of the particular content item is requested by the author via a plug-in to content authoring software used to author the particular content item, and wherein the particular content item and associated key are returned to a device of the author.

13. The apparatus of claim 8, wherein the user consumption data further includes one or more of: identities of one or more users who view the particular content item, identities of other users to whom a particular user has provided copies of the particular content item, and user dwell time on the particular content item.

14. The apparatus of claim 8, wherein the program instructions for providing the user consumption data to the author further comprise instructions to provide new usage data to the author in response to the new usage data becoming available.

15. One or more non-transitory computer readable storage media collectively having program instructions embodied therewith, the program instructions executable by a computer to cause the computer to:
receive document including a plurality of different content items including a particular content item provided by an author;
associate a key of a plurality of keys with each content item, wherein each key includes a two-dimensional barcode that is not discernible by human vision and is detected via image processing, wherein the two-dimensional barcode is inserted into the particular content item such that each pixel of the two-dimensional barcode is one hexadecimal color code lighter or darker than a corresponding pixel of the particular content item, and wherein each key corresponds to a different content item of the plurality of different content items of the document;
identify, based on a key of the plurality of keys, that a user is presenting the particular content item in a communication session;
in response to determining that the author has updated the particular content item, notify the user that an updated version of the particular content item is available for presentation in the communication session;
generate user consumption data of the particular content item based on a corresponding key, wherein the user consumption data for the particular content item indicates one or more of user edits to the particular content item; and
provide the user consumption data to an endpoint device of the author.

16. The one or more non-transitory computer readable storage media of claim 15, wherein the instructions to notify the user further cause the computer to automatically provide the updated version of the particular content item to participants of the communication session.

17. The one or more non-transitory computer readable storage media of claim 15, wherein each key remains associated with a corresponding content item when the corresponding content item is copied or inserted into another document.

18. The one or more non-transitory computer readable storage media of claim 15, wherein the program instructions further cause the computer to:
in response to determining that the author has updated the particular content item, identify one or more users who have copied the particular content item, and notify the one or more users that the updated version of the particular content item is available.

19. The one or more non-transitory computer readable storage media of claim 15, wherein the user consumption data further includes one or more of: identities of one or more users who view the particular content item, identities of other users to whom a particular user has provided copies of the particular content item, and user dwell time on the particular content item.

20. The one or more non-transitory computer readable storage media of claim 15, wherein the program instructions for providing the user consumption data to the author further cause the computer to provide new usage data to the author in response to the new usage data becoming available.

* * * * *